US011007765B2

(12) United States Patent
Drexler et al.

(10) Patent No.: US 11,007,765 B2
(45) Date of Patent: May 18, 2021

(54) EDGE DELAMINATION METHODS AND SYSTEMS

(71) Applicant: The Boeing Company, Chicago, IL (US)

(72) Inventors: Jason W. Drexler, Brier, WA (US); Joseph James Dickson, Everett, WA (US); James D. McLean, Stanwood, WA (US)

(73) Assignee: The Boeing Company, Chicago, IL (US)

( * ) Notice: Subject to any disclaimer, the term of this patent is extended or adjusted under 35 U.S.C. 154(b) by 54 days.

(21) Appl. No.: 16/016,346

(22) Filed: Jun. 22, 2018

(65) Prior Publication Data

US 2019/0270296 A1    Sep. 5, 2019

Related U.S. Application Data

(60) Provisional application No. 62/638,055, filed on Mar. 2, 2018.

(51) Int. Cl.
*B32B 38/10* (2006.01)
*B32B 37/20* (2006.01)
(Continued)

(52) U.S. Cl.
CPC ........ *B32B 38/105* (2013.01); *B32B 37/0046* (2013.01); *B32B 37/0053* (2013.01);
(Continued)

(58) Field of Classification Search
CPC ..... B32B 38/105; B32B 37/20; B32B 37/206; B32B 37/226; B32B 2037/262;
(Continued)

(56) References Cited

U.S. PATENT DOCUMENTS 2,813,054 A * 11/1957 Nicholas ................. B29C 65/62
156/93
3,386,199 A *  6/1968 Masanori ............. A47G 1/0633
40/772
(Continued)

FOREIGN PATENT DOCUMENTS

EP          1331071      7/2003
WO    WO 2017/075151    5/2017

OTHER PUBLICATIONS

"Heated roll laminator", Wikipedia, Mar. 15, 2018, 2 pages [online], [retrieved on Jun. 22, 2018]. Retrieved from the Internet <URL:https://en.wikipedia.org/wiki/Heated_roll_laminator>.
(Continued)

*Primary Examiner* — Mark A Osele
(74) *Attorney, Agent, or Firm* — Haynes and Boone LLP

(57) ABSTRACT

Methods and systems according to one or more examples are provided for laminating composite materials. In one example, a method comprises receiving a first layer material and a second layer material at a nip roller assembly and laminating, by the nip roller assembly, the first and second layer material to provide a laminated composite material comprising a main portion and at least one edge portion. The method further comprises delaminating the at least one edge portion of the laminated composite material to provide a partially laminated composite material for use in manufacturing a composite product.

20 Claims, 5 Drawing Sheets

(51) Int. Cl.
  *B32B 38/00*   (2006.01)
  *B32B 37/00*   (2006.01)
  *B32B 43/00*   (2006.01)

(52) U.S. Cl.
  CPC .............. *B32B 37/20* (2013.01); *B32B 38/10* (2013.01); *B32B 43/006* (2013.01); *B32B 2605/18* (2013.01)

(58) Field of Classification Search
  CPC ......... Y10T 156/1179; Y10T 156/1184; Y10T 156/1967; Y10T 156/1983; Y10T 156/1989
  USPC .................................................. 156/152, 298
  See application file for complete search history.

(56) References Cited

U.S. PATENT DOCUMENTS

| | | | | |
|---|---|---|---|---|
| 3,518,145 A * | 6/1970 | Christensen | ......... | B31D 1/0075 156/248 |
| 3,720,130 A * | 3/1973 | Holson | .................... | B42D 1/08 40/536 |
| 3,736,685 A * | 6/1973 | Shibata | .................... | B42F 5/00 40/772 |
| 3,857,192 A * | 12/1974 | Mascolo | ............. | B32B 37/1292 40/772 |
| 3,988,194 A * | 10/1976 | Babcock | ........... | A61F 13/15756 156/459 |
| 4,151,319 A * | 4/1979 | Sackoff | ....................... | C09J 7/38 428/41.4 |
| 4,380,485 A * | 4/1983 | Schuster | ................ | B65D 31/02 156/254 |
| 5,538,573 A * | 7/1996 | Anderson | ............... | B29C 65/02 156/152 |
| 5,851,617 A * | 12/1998 | Keiser | ........................ | C09J 7/26 428/41.8 |
| 5,858,157 A * | 1/1999 | Lin | ......................... | B29C 63/02 156/108 |
| 7,595,104 B2 * | 9/2009 | Romanowski | ........ | B32B 27/306 428/40.1 |
| 8,272,549 B1 * | 9/2012 | Corkren | ................. | B65H 35/004 225/34 |
| 9,358,770 B2 * | 6/2016 | Dong | .................... | B32B 43/006 |
| 2010/0038169 A1 * | 2/2010 | Lee | ....................... | E04B 1/8409 181/294 |

OTHER PUBLICATIONS

European Search Report, European Patent Application No. 19156116.6, dated Jul. 8, 2019, 7 pages.

* cited by examiner

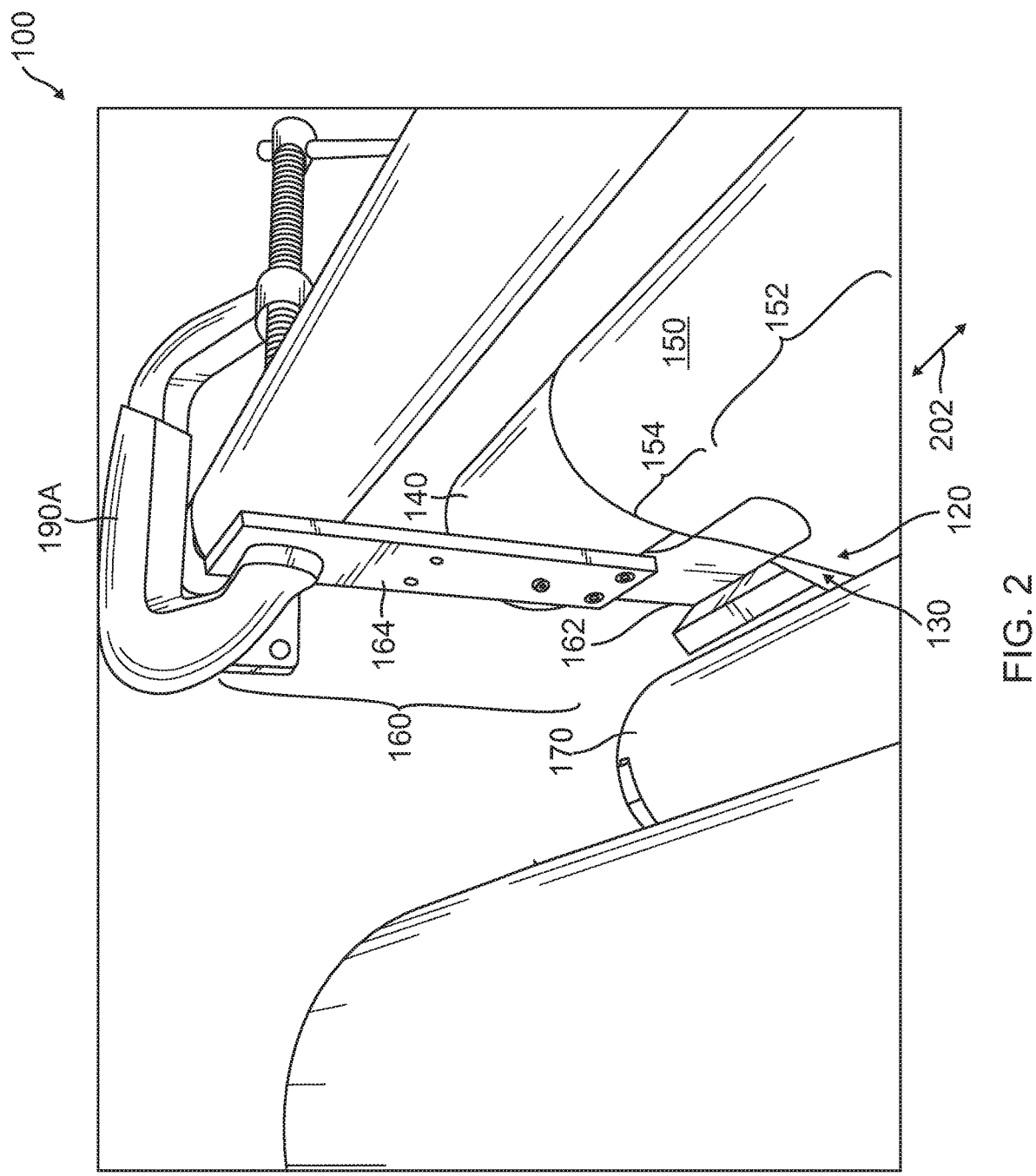

EDGE DELAMINATION METHODS AND SYSTEMS

CROSS REFERENCE TO RELATED APPLICATIONS

This application claims the benefit of and priority to U.S. Provisional Patent Application No. 62/638,055 filed Mar. 2, 2018 and entitled "EDGE DELAMINATION METHODS AND SYSTEMS" which is incorporated herein by reference in its entirety.

TECHNICAL FIELD

The present disclosure relates generally to the manufacture of composite materials and more specifically to improved techniques for laminating composite materials.

BACKGROUND

Various lamination processes are commonly used in the manufacture of composite materials. In this regard, heat or pressure may be applied to two or more layers which cause them to adhere, bind, or otherwise become fixed together. For example, in some cases, bonding agents or other materials provided between the layers may be activated by the applied heat or pressure to laminate the layers together.

In some conventional lamination processes, the edges of the resulting composite material may exhibit undesirable non-uniformities after passing through a nip roller assembly. Such non-uniformities may include, for example, curling of the edges, wrinkles, waves, inconsistent surface textures at the edges, and/or other inconsistencies.

Unfortunately, such edge non-uniformities can be problematic for downstream manufacturing processes. For example, certain processes may be preferably performed on a laminated composite material that is disposed in a substantially flat orientation. Non-uniformities in the edges of the laminated composite material may reduce the efficacy of such processes.

One conventional approach to solving these problems involves the use of nip rollers having a reduced width to avoid laminating the edges of the composite material. In this case, the nip rollers may be applied to a main portion of the layers, while the edges of the layers pass through unaffected. Unfortunately, this approach can be of only limited use as the costs and practical implementation of nip rollers generally require them to be maintained at a fixed size.

In another approach, it may be possible to discard the non-uniform edge portions of the laminated composite material, for example, by severing them from the main body of the laminated composite material. However, such an approach is also costly and results in wasted material.

Accordingly, there is a need for improved systems, apparatus, and related methods to reduce non-uniformities in the edges of laminated composite materials.

SUMMARY

Methods and systems are disclosed herein that provide improved techniques for laminating materials. In some examples, a laminated composite material is formed from a thin film cap layer and a thin film substrate layer that are pressed together and subsequently delaminated at an edge to form a partially delaminated composite material. The cap layer and substrate layer are unwound from respective spools and fed through a nip roller assembly. The cap layer is heated during the feeding and the compliant substrate layer is pressed against the cap layer to form the laminated composite material by application of heat and pressure. The laminated composite material is selectively delaminated at one or more edges and taken up at a rewind roller.

In one example, a method includes receiving a first layer material and a second layer material at a nip roller assembly; laminating, by the nip roller assembly, the first and second layer material to provide a laminated composite material comprising a main portion and at least one edge portion; and delaminating the at least one edge portion of the laminated composite material to provide a partially laminated composite material for use in manufacturing a composite product.

In another example, a system includes a nip roller assembly configured to laminate a first layer material and a second layer material to provide a laminated composite material comprising a main portion and at least one edge portion; and a delaminator positioned to receive the laminated composite material from the nip roller assembly and configured to delaminate the at least one edge portion of the laminated composite material to provide a partially laminated composite material for use in manufacturing a composite product.

The scope of the disclosure is defined by the claims, which are incorporated into this section by reference. A more complete understanding of examples of the disclosure will be afforded to those skilled in the art, as well as a realization of additional advantages thereof, by a consideration of the following detailed description of one or more examples. Reference will be made to the appended sheets of drawings that will first be described briefly.

BRIEF DESCRIPTION OF THE DRAWINGS

FIG. 2 illustrates a delaminator of the lamination system of FIG. 1B in accordance with an example of the disclosure.

Examples of the present disclosure and their advantages are best understood by referring to the detailed description that follows. It should be appreciated that like reference numerals are used to identify like elements illustrated in one or more of the figures.

DETAILED DESCRIPTION

Various examples of the present disclosure provide for improved approaches to laminating materials. Materials that are commonly laminated include, but are not limited to, a thin film cap layer material laminated to a thin film substrate layer material to produce a laminated composite material. To prepare the laminated composite material for further processing, the present disclosure provides for delaminating one or more edges of the laminated composite material. Such delamination method eliminates waviness or wrinkles and allows for the composite material to lie flat, thus improving the effectiveness of downstream processing operations. In some examples, the cap layer material and/or the substrate layer material may be thin film materials that range in thickness from approximately one to two thousandths of an inch.

Figure 1A:
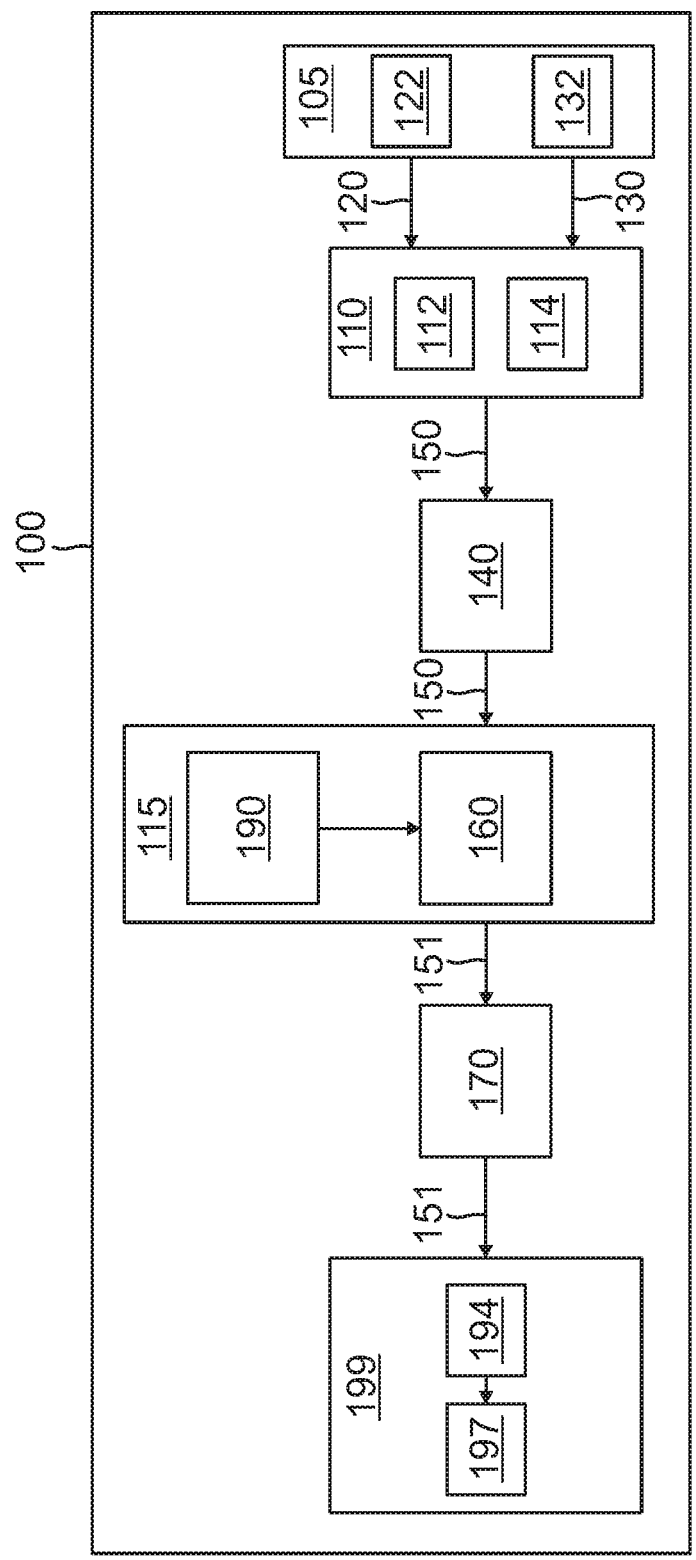
FIG. 1A illustrates a block diagram of a lamination system in accordance with an example of the disclosure.

FIG. 1A illustrates a block diagram of a lamination system 100 in accordance with an example of the disclosure. As illustrated, lamination system 100 includes a composite layer material supply 105, a nip roller assembly 110 (e.g., a primary laminator), a delaminator assembly 115, and a post-processing subsystem 199. Lamination system 100 may be configured to perform lamination operations, delamination operations, and post-processing operations to manufacture a finished composite product.

Composite layer material supply 105 is configured to supply thin film material, such as a cap layer material 120 and a substrate layer material 130, used for forming a laminated composite material 150, as discussed herein. Composite layer material supply 105 includes a cap layer unwind spool 122 and a substrate layer unwind spool 132. Cap layer unwind spool 122 contains cap layer material 120. Substrate layer unwind spool 132 contains substrate layer material 130.

Nip roller assembly 110 is configured to laminate thin film materials, such as cap layer material 120 and substrate layer material 130, to form laminated composite material 150, as discussed herein. Nip roller assembly 110 includes a heated roller 112 and a compliant roller 114. In addition, an outtake roller 140 is configured to support laminated composite material 150.

Delaminator assembly 115 is configured to delaminate one or more edges of laminated composite material 150 to form a partially laminated composite material 151. Delaminator assembly 115 includes a position mechanism 190 and a delaminator 160.

Post-processing subsystem 199 is configured to perform various manufacturing operations on partially laminated composite material 151. Post-processing subsystem 199 includes a flat surface 194 and a post-processing laminator 197.

Figure 1B:
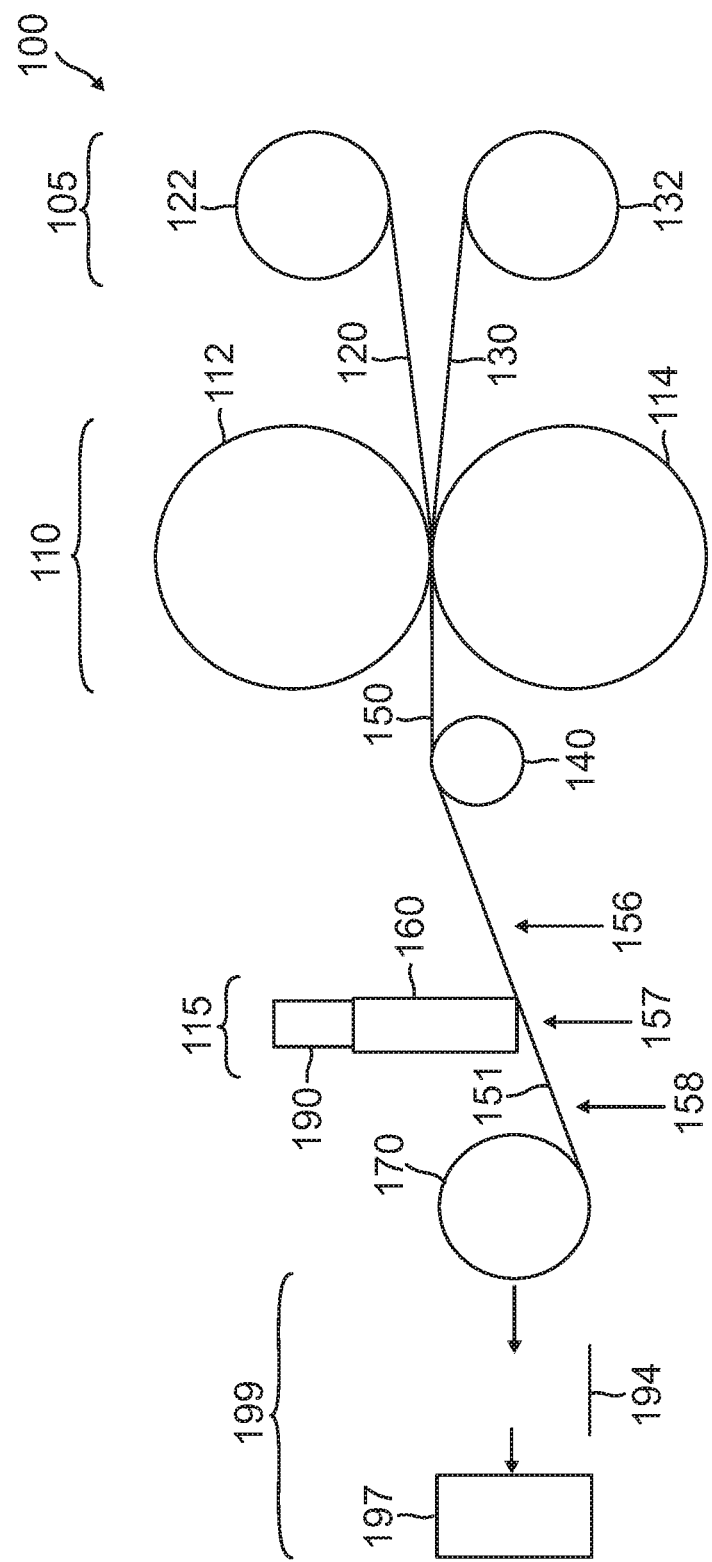
FIG. 1B illustrates a block diagram of a lamination system with further configuration details illustrated in accordance with an example of the disclosure.

FIG. 1B illustrates a block diagram of the lamination system 100 with further configuration details illustrated in accordance with an example of the disclosure. As shown in FIG. 1B, lamination system 100 includes cap layer unwind spool 122 and substrate layer unwind spool 132 (e.g., as part of composite layer material supply 105), nip roller assembly 110, position mechanism 190 and delaminator 160 (e.g., as part of delaminator assembly 115), composite layer rewind spool 170, and post-processing subsystem 199. As further discussed below, lamination system 100 may be configured to laminate cap layer material 120 to substrate layer material 130 to form laminated composite material 150. In some examples, cap layer material 120 and substrate layer material 130 are implemented as a thin film material. In addition, lamination system 100 may be further configured to delaminate cap layer material 120 from substrate layer material 130 at one or more edges to form partially laminated composite material 151 that is partially delaminted at one or more edges. Position mechanism 190 may be used to position and/or move delaminator 160 to selectively adjust a width of the edge portion to be delaminated.

In some examples, cap layer material 120 is wound or otherwise disposed on cap layer unwind spool 122 and fed into nip roller assembly 110. Substrate layer material 130 is wound or otherwise disposed on substrate layer unwind spool 132 and fed into nip roller assembly 110. Nip roller assembly 110 includes heated roller 112 and compliant roller 114 that receive cap layer material 120 and substrate layer material 130, respectively. Heated roller 112 applies heat at the cap layer material 120 to thermally bond the cap layer material 120 to the substrate layer material 130 while compliant roller 114 in conjunction with heated roller 112 applies pressure to adhere the cap layer material 120 and the substrate layer material 130 together to form laminated composite material 150. Laminated composite material 150 is supported by outtake roller 140 as it moves toward composite layer rewind spool 170.

In some examples, before laminated composite material 150 is received at composite layer rewind spool 170, an edge delamination is performed where one or more edges of laminated composite material 150 is delaminated. In this regard, laminated composite material 150 is fed to delaminator 160 at a position 156. Delaminator 160 is interposed between cap layer material 120 and substrate layer material 130 at position 157 of FIG. 1B. Delaminator 160 may be interposed between a leader portion of cap layer material 120 and substrate layer material 130 by position mechanism 190 before the start of the lamination process.

Position mechanism 190 may move delaminator 160 to selectively adjust a width of one or more edge portions to be delaminated. In some examples, position mechanism 190 may be manually operated to move delaminator 160, as further discussed with regard to FIG. 2. In other examples, delaminator 160 is moved by an automated implementation of position mechanism 190, as further discussed with regard to FIG. 3.

In some examples, delaminator 160 selectively separates cap layer material 120 and substrate layer material 130 of laminated composite material 150 to form partially laminated composite material 151 at a position 158 that is partially delaminted. Composite layer rewind spool 170 is used to collect the partially laminated composite material 151. In this regard, the partially laminated composite material 151, having been partially delaminated, lies flat on a working surface in preparation for additional manufacturing operations in the production of a final product, for example, a composite product used in an interior of an aircraft.

Post-processing subsystem 199 performs additional manufacturing operations such as adding additional layers, texturing the laminated composite material 150, adding a backing material, and/or re-laminating the edge previously delaminted, as discussed herein. Post-processing subsystem 199 includes a flat surface 194 configured to receive partially laminated composite material 151 from composite layer rewind spool 170.

Post-processing subsystem 199 also includes a post-processing laminator 197 configured to re-laminate one or more edges of partially laminated composite material 151 received from flat surface 194. Post-processing laminator 197 may be implemented with one or more rollers, ovens, and/or other appropriate lamination devices.

FIG. 2 illustrates delaminator 160 of the lamination system 100 of FIG. 1B in accordance with an example of the disclosure. As shown in FIG. 2, lamination system 100 includes various features previously identified in FIG. 1B including delaminator 160, outtake roller 140, and composite layer rewind spool 170. In the example shown in FIG. 2, the position mechanism is implemented by a manually operated position mechanism 190A. As shown, position mechanism 190A is implemented as a C-clamp fixed to a mount 166 and used to secure delaminator 160 in place relative to laminated composite material 150. Although a C-clamp is illustrated, other types of holding devices are possible, such as an A-clamp, a twist clamp, and/or a fixed fastening device, for example.

Figure 3:
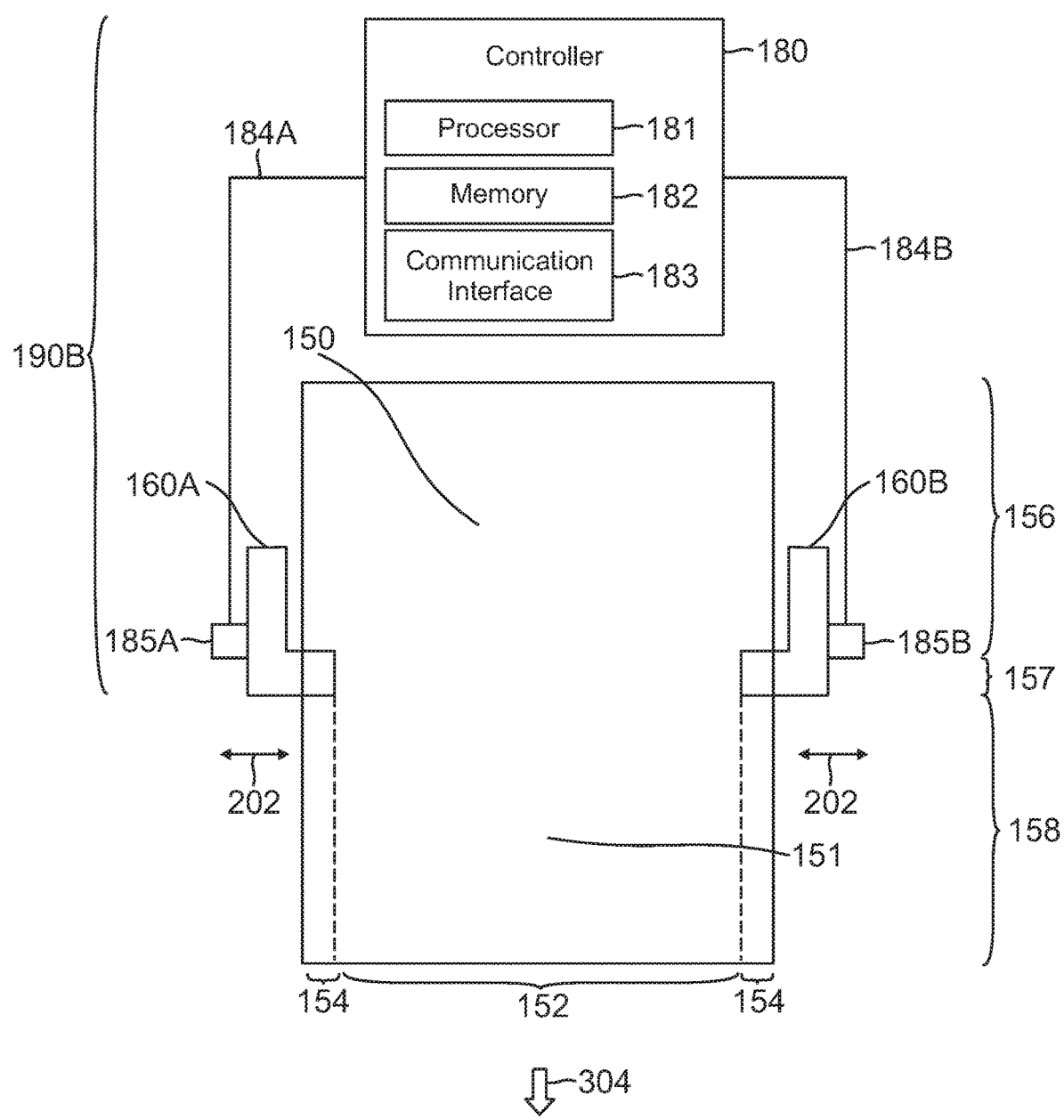
FIG. 3 illustrates a plan view of the lamination system of FIG. 1B in accordance with an example of the disclosure.

In various examples, delaminator 160 is adjusted at edge 154 of laminated composite material 150. Position mechanism 190A may be adjusted to selectively control a delamination width and/or a height of delaminator 160 at edge 154. In some examples, delaminator 160 of FIG. 2 may also be provided at an opposite side of laminated composite material 150 (as shown in FIG. 3), and selectively adjusted using position mechanism 190A fixed to mount 166 at the opposite side. In this regard, lamination system 100 provides both modularity and adaptability for de-laminating one or more edges 154 at selective delamination widths and/or heights for various sizes of laminated composite material 150.

In this particular example, delaminator 160 includes a bias member 162 and a base member 164. Bias member 162 is secured by base member 164 in a fixed location at the edge of laminated composite material 150. Bias member 162 is interposed between cap layer material 120 and substrate layer material 130 of laminated composite material 150 at the edge 154. Bias member 162 may be selectively positioned (e.g., by positioning base member 164) to select a delamination width of edge 154 of laminated composite material 150 along the directions identified by arrows 202. In this regard, as illustrated in FIG. 2, position mechanism 190A is implemented as a C-clamp that is loosened to move base member 164 to selectively adjust a delamination width and/or a height of bias member 162 along laminated composite material 150. As laminated composite material 150 moves from heated roller 112 and compliant roller 114 (not shown) past outtake roller 140, bias member 162 separates laminated composite material 150 at edge 154. Main portion 152 of laminated composite material 150 remains laminated as partially laminated composite material 151, having been partially delaminated, is taken up by composite layer rewind spool 170.

FIG. 3 illustrates a plan view of the lamination system 100 of FIG. 1B in accordance with an example of the disclosure. In the example shown in FIG. 3, lamination system 100 includes delaminator 160A and delaminator 160B, each of which may be implemented in the same or similar manner as delaminator 160 shown in FIG. 2. Also in FIG. 3, the position mechanism is implemented by a position mechanism 190B which may be used to selectively adjust the position of delaminators 160A and 160B. As shown, position mechanism 190B includes a controller 180 and actuators 185A and 185B. In this particular example, controller 180 provides control signals 184A and 184B to actuators 185A and 185B, respectively, to control movement of delaminators 160A and 160B, respectively.

Controller 180 includes a processor 181, a memory 182, and a communication interface 183. Processor 181 may include, for example, a microprocessor, a single-core processor, a multi-core processor, a microcontroller, an application-specific integrated circuit (ASIC), a logic device (e.g., a programmable logic device configured to perform processing operations), a digital signal processing (DSP) device, one or more memories for storing executable instructions (e.g., software, firmware, or other instructions), and/or any other appropriate combination of processing device and/or memory to execute instructions to perform any of the various operations described herein.

In various examples, where the processing operation is automated, it should be appreciated that processing operations and/or instructions are integrated in software and/or hardware as part of processor 181, or code (e.g., software or configuration data) which is stored in memory 182. Examples of processing operations and/or instructions disclosed herein are stored by a machine readable medium in a non-transitory manner (e.g., a memory, a hard drive, a compact disk, a digital video disk, or a flash memory) to be executed by a computer (e.g., logic or processor-based system) to perform various methods disclosed herein.

Memory 182 includes one or more memory devices (e.g., one or more memories) to store data and information. The one or more memory devices include various types of memory including volatile and non-volatile memory devices, such as RAM (Random Access Memory), ROM (Read-Only Memory), EEPROM (Electrically-Erasable Read-Only Memory), flash memory, or other types of memory. In one example, processor 181 is adapted to execute software stored in memory 182 to perform various methods, processes, and operations in a manner as described herein.

Controller 180 is adapted to interface and communicate with actuator 185A, actuator 185B, and/or other devices (e.g., such as a display (not shown), for example) via a communication interface 183 to perform method and processing steps as described herein. Communication interface 183 includes wired or wireless communication buses within lamination system 100. Communication interface 183 may be implemented as a wireless communication interface and may include, for example, Wi-Fi, Bluetooth, Zigbee, and/or other radio wave or optical interfaces.

In one example, controller 180 controls movement of delaminators 160A and 160B. In this regard, controller 180 communicates with actuators 185A and 185B via control signals 184A and 184B, respectively, to operate actuators 185A and 185B to move delaminators 160A and 160B in directions identified by arrows 202 to adjust a delamination width. Actuators 185A and 185B can be implemented as linear actuators, mechanical actuators, hydraulic actuators, electro-mechanical actuators, and/or other devices as appropriate.

In the above example, controller 180 may operate actuators 185A and 185B to move synchronously or independently to adjust delaminator 160A and/or 160B inward approximately two inches maximum from edge 154 of laminated composite material 150, at position 157. Other delaminator 160 adjustments are possible alone or in combination with adjustments described above.

As illustrated in FIG. 3, laminated composite material 150, including cap layer material 120 and substrate layer material 130, moves in a direction identified by arrow 304 along position 156. As laminated composite material 150 reaches position 157, cap layer material 120 and substrate layer material 130 are separated at an edge 154 by one or both delaminators 160A and 160B. A partially laminated composite material 151 including edge 154 portions that have been delaminated (e.g., as illustrated by dashed lines in FIG. 3), and main portion 152 (e.g., with lamination intact) proceeds to composite layer rewind spool 170 along position 158. In this regard, lamination system 100 provides for a delaminator 160 that is selectively positionable and efficiently produces a partially laminated composite material 151 that is partially delaminated and advantageously lies flat on a working surface when performing secondary manufacturing operations.

In one example, delaminator 160 is positioned between the cap layer material 120 and substrate layer material 130 during an initial setup of lamination system 100. In this regard, a leader material of cap layer material 120 is spooled from cap layer unwind spool 122 and fed through nip roller assembly 110 to position 157. In addition, a leader material of substrate layer material 130 is spooled from substrate layer unwind spool 132 and fed through nip roller assembly 110 to position 157. Cap layer material 120 and substrate layer material 130 are not laminated at this time to provide for delaminators 160A and 160B to be effectively interposed between cap layer material 120 and substrate layer material 130. Inserting delaminator 160 between non-laminated leader materials prior to the start of the lamination process provides for efficient delamination of edge 154 without tearing or ripping of the laminated composite material 150 during the lamination/partial delamination operation.

Figure 4:
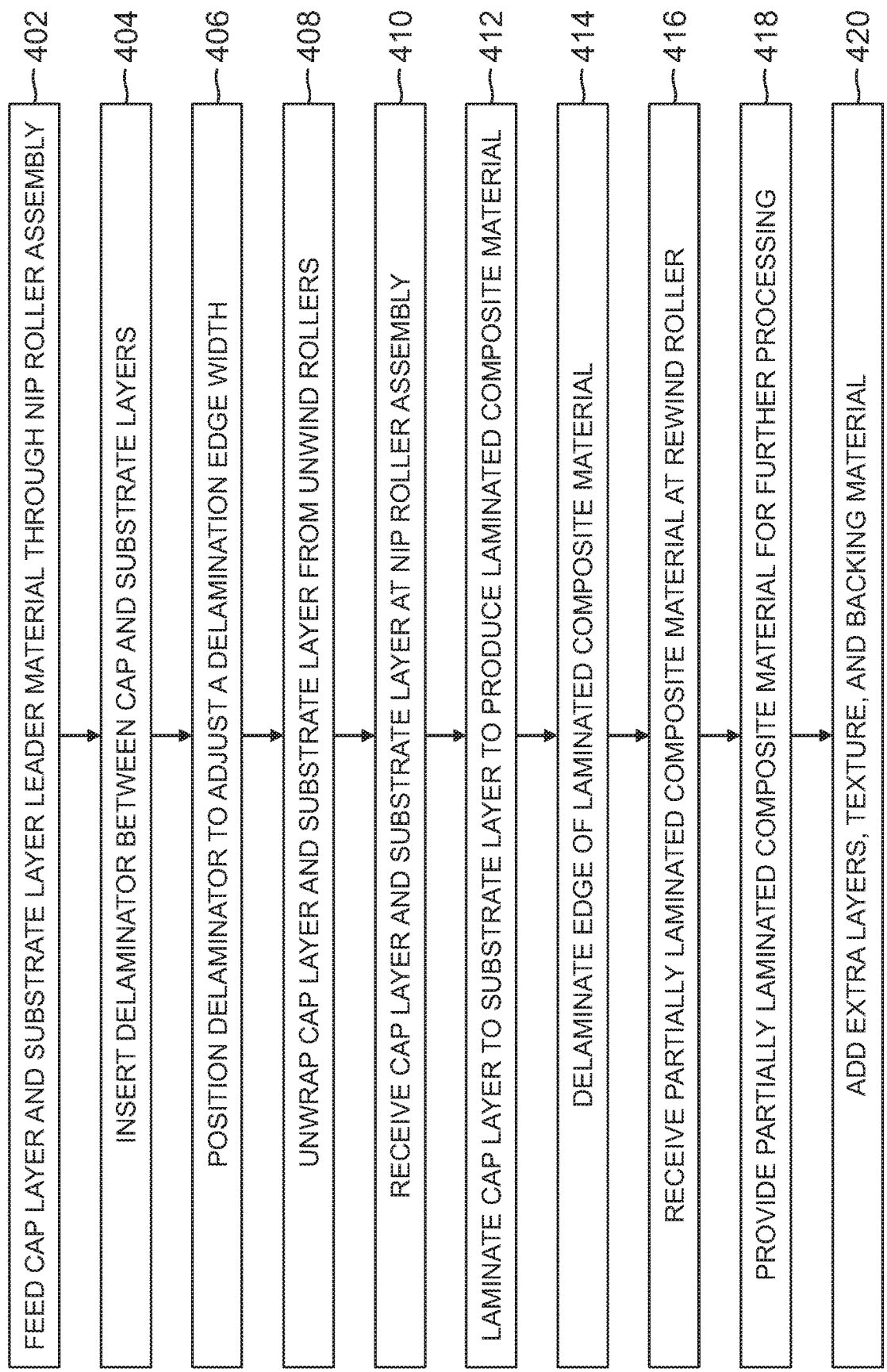
FIG. 4 illustrates a process for providing a composite product in accordance with an example of the disclosure.

FIG. 4 illustrates a process for providing a composite product in accordance with an example of the disclosure. The process may begin in block 402 to initially set up lamination system 100. Leader material of cap layer material 120 is unwound from cap layer unwind spool 122 and fed through nip roller assembly 110 between heated roller 112 (e.g., not heated at this time) and compliant roller 114 to position 157. In addition, leader material of substrate layer material 130 is unwound from substrate layer unwind spool 132 and fed through nip roller assembly 110 to position 157.

In block 404, delaminator 160 is inserted between non-laminated leader material of cap layer material 120 and substrate layer material 130 at position 157.

In block 406, delaminator 160 is positioned at edge 154 and selectively adjusted to control a delamination width of laminated composite material 150 at edge 154. Leader material of cap layer material 120 and leader material of substrate layer material 130 are fed to and wound at composite layer rewind spool 170.

In block 408, cap layer material 120 and substrate layer material 130 are unwrapped from cap layer unwind spool 122 and substrate layer unwind spool 132, respectively.

In block 410, cap layer material 120 and substrate layer material 130 are received at nip roller assembly 110. In some examples, cap layer material 120 is received nearest heated roller 112 and substrate layer material 130 is received nearest compliant roller 114. In some examples, such positioning may be reversed.

In block 412, cap layer material 120 is laminated to substrate layer material 130 to produce laminated composite material 150.

In block 414, edge 154 at a side of laminated composite material 150 is delaminated by delaminator 160 to produce edge 154 delaminated portion and main portion 152 of partially laminated composite material 151. In some examples, delaminator 160 is included on an opposite side and is used to delaminate a second opposite side of laminated composite material 150.

In block 416, composite layer rewind spool 170 receives partially laminated composite material 151 that has been delaminated at one or more edges.

In block 418, partially laminated composite material 151, having been partially delaminated, is provided for further processing by positioning in a substantially flat orientation on a substantially flat surface 194 and performing additional manufacturing operations while in the flat orientation.

In block 420, additional manufacturing operations may be performed on the partially laminated composite material 151 with delaminated edge 154 portions (e.g., a re-lamination of edges 154 or other operations) to provide a manufactured composite product (e.g., wallpaper configured to be affixed to an interior of an aircraft and/or other products). Additional manufacturing operations may include one or more of adding additional layers, texturing the laminated composite material, adding a backing material, re-laminating one or more edge 154 portions of partially laminated composite material 151, and/or other manufacturing operations using post-processing laminator 197 of post-processing subsystem 199.

In view of the present disclosure, it will be appreciated that a lamination system 100 implemented in accordance with various examples set forth herein may provide for a partially laminated composite material 151 in a substantially flat orientation that improves downstream processing steps in manufacturing a finished composite product. The lamination system 100 incorporates a nip roller assembly 110 to laminate a cap layer material 120 and a substrate layer material 130 to provide a laminated composite material 150, and a delaminator 160 positioned to receive the laminated composite material 150 from an outtake roller 140 to delaminate an edge 154 portion of the laminated composite material 150 to provide a partially laminated composite material 151 that has been partially delaminated and lies flat, free of waviness, wrinkles and/or other inconsistencies, all to optimize fabrication and manufacturability without the need for additional processing steps to eliminate inconsistencies that add schedule time and cost to the finished composite product.

Where applicable, various examples provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Examples described above illustrate but do not limit the disclosure. It should also be understood that numerous modifications and variations are possible in accordance with the principles of the present disclosure. Accordingly, the scope of the disclosure is defined only by the following claims.

What is claimed is:

1. A method comprising:
    receiving a first layer material and a second layer material at a nip roller assembly;
    laminating, by the nip roller assembly, the first and second layer material to provide a laminated composite material comprising a main portion and at least one edge portion;
    delaminating, by a delaminator comprising a bias member, the at least one edge portion of the laminated composite material to provide a partially laminated composite material for use in manufacturing a composite product; and
    laminating the at least one edge portion of the partially laminated composite material.

2. The method of claim 1, wherein:
the at least one edge portion is a first edge portion at a first side of the laminated composite material;
the laminated composite material further comprises a second edge portion at a second opposite side of the laminated composite material; and
the method further comprises delaminating the second edge portion of the laminated composite material.

3. The method of claim 1, wherein the delaminator is positioned to receive the laminated composite material from the nip roller assembly.

4. The method of claim 3, wherein the bias member is configured to separate the first layer material from the second layer material at the at least one edge portion of the laminated composite material.

5. The method of claim 4, further comprising selectively positioning the bias member relative to the laminated composite material to adjust a width of the edge portion.

6. The method of claim 1, wherein the first layer material is a cap layer material and the second layer material is a substrate layer material.

7. The method of claim 1, wherein the composite product is configured to be applied to an aircraft.

8. The method of claim 1, wherein the laminating comprises applying heat and pressure to the first and second layer material by one or more nip rollers of the nip roller assembly.

9. The method of claim 1, further comprising:
positioning the partially laminated composite material in a substantially flat orientation; and
performing a manufacturing operation on the laminated composite material while in the substantially flat orientation.

10. The method of claim 9, wherein the edge portion of the partially laminated composite material is laminated following the manufacturing operation.

11. A system comprising:
a nip roller assembly configured to laminate a first layer material and a second layer material to provide a laminated composite material comprising a main portion and at least one edge portion;
a delaminator positioned to receive the laminated composite material from the nip roller assembly and configured to delaminate the at least one edge portion of the laminated composite material to provide a partially laminated composite material for use in manufacturing a composite product; and
a post-processing laminator configured to laminate the at least one edge portion of the partially laminated composite material to manufacture the composite product.

12. The system of claim 11, wherein:
the at least one edge portion is a first edge portion at a first side of the laminated composite material;
the laminated composite material further comprises a second edge portion at a second opposite side of the laminated composite material; and
the delaminator is further configured to delaminate the second edge portion of the laminated composite material.

13. The system of claim 11, wherein the delaminator comprises a bias member configured to separate the first layer material from the second layer material at the edge portion of the laminated composite material.

14. The system of claim 13, further comprising a controller configured to operate a position mechanism to selectively position the bias member, wherein the bias member is configured to be selectively positioned relative to the laminated composite material to adjust a width of the edge portion.

15. The system of claim 13, wherein the delaminator further comprises a base member connected to the bias member to set a position of the bias member.

16. The system of claim 11, wherein the first layer material is a cap layer material and the second layer material is a substrate layer material.

17. The system of claim 11, wherein the composite product is configured to be applied to an aircraft.

18. The system of claim 11, wherein the nip roller assembly comprises one or more nip rollers configured to apply heat and pressure to the first and second layer material.

19. The system of claim 11, further comprising a substantially flat surface configured to receive the partially laminated composite material in a substantially flat orientation to perform a manufacturing operation.

20. The system of claim 19, wherein the post-processing laminator is configured to laminate the at least one edge portion of the partially laminated composite material following the manufacturing operation.

* * * * *